US006796540B1

(12) United States Patent
Manceor

(10) Patent No.: US 6,796,540 B1
(45) Date of Patent: Sep. 28, 2004

(54) TWO POSITION MOUNTING BRACKET FOR COMPUTER DISPLAY

(75) Inventor: Michael J. Manceor, Troy, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/402,867

(22) Filed: Mar. 24, 2003

(51) Int. Cl.[7] .................................................. E04G 3/00
(52) U.S. Cl. ..................... 248/284.1; 248/126; 248/456
(58) Field of Search ................................ 248/398, 371, 248/284.1, 447, 454, 455, 456, 457, 126, 286.1, 918

(56) References Cited

U.S. PATENT DOCUMENTS 5,141,196 A * 8/1992 Arnold et al. .............. 248/397
5,640,301 A * 6/1997 Roecker et al. ............. 361/686
6,402,109 B1 * 6/2002 Dittmer ................... 248/284.1
6,554,242 B2 * 4/2003 Kim ........................... 248/371
6,604,722 B1 * 8/2003 Tan ......................... 248/276.1

FOREIGN PATENT DOCUMENTS

DE 10118496 A1 * 4/2001 ............ B60N/3/00

* cited by examiner

*Primary Examiner*—Gwendolyn Baxter
(74) *Attorney, Agent, or Firm*—David L. Kuhn; Clifford C. Carter; Gail S. Soderling

(57) ABSTRACT

A bracket for mounting a view screen fixes the screen in a retracted or a deployed position. The bracket has a base plate fixed to an upright panel. A carrier plate both swings and vertically translates on the base plate. Hinged between the base plate and the carrier plate is a bridge plate. The carrier plate holds the screen, whereby swinging the carrier plate away from the base plate will tilt the screen. A latch subassembly disposed on the carrier plate has a finger that locks to either a tang of the bridge plate or a projection of the base plate to hold the bracket respectively in the deployed or the retracted position. The latch subassembly includes a grip-squeeze actuator to release the finger from the bridge plate or the base plate.

6 Claims, 3 Drawing Sheets

TWO POSITION MOUNTING BRACKET FOR COMPUTER DISPLAY

GOVERNMENT USE

The invention described here may be made, used and licensed by the or for the U.S. Government for governmental purposes without paying me any royalty.

BACKGROUND

In recent years, the United States Army has embraced a doctrinal concept known as the digitized battlefield. One aspect of the digitized battlefield is a high rate of data processing and electronic communication among a network of users, some of which are often vehicles speeding across unfamiliar terrain. Typical vehicles in the network are tanks, reconnaissance vehicles or armored personnel carriers. These vehicles use the network for tasks such as tracking all friendly units simultaneously or immediately giving these units tactical data acquired by one vehicle. Information from the network is displayed on viewing screens or computer monitors at the commander's station of the individual vehicles. Particularly during intense tactical events, vehicle commanders need to watch the viewing screens constantly.

A problem exists in some vehicles if the vehicle's commander stands up to look outside the vehicle. The commander then can not see information on the screen. This happens because the screen is fixedly faced horizontally toward the commnander's head as he sits. When the commander stands the viewing angle is too poor for him to read the screen. One solution for this is to install new screen mounting brackets in vehicles that allow the screen to tilt up when the commander stands. This solution allows the screen to normally occupy minimum space as it lies flat against an inner vehicle panel, and yet allows the screen to be tilted on demand. A specific example of such a solution is shown by U.S. Pat. No. 6,431,511 to Pfister. In Pfister, a mounting plate is fixed to a panel inside the vehicle. A frame plate is hinged to the mounting plate and has the screen mounted thereon. Swinging of the frame plate out from the mounting plate tilts the screen so the vehicle commander can see it while standing. A guide plate is hinged to the mounting plate and to a slide plate that translates on the frame plate. The attachment is such that all the plates together form a triangular configuration when the screen is tilted but these plates form a flat configuration when the screen is not tilted. The slide plate accommodates part of the relative motion among the plates as the screen is moved. A latch on the stationary plate engages either the slide plate or the mounting plate to lock the screen in either the tilted or non-tilted positions.

SUMMARY

The present invention is an improved bracket for mounting a relatively flat screen or other relatively flat visual display device in a combat vehicle. The mounting is such that the screen can be moved from a vertical orientation to a tilted orientation in order to address the problem described above. The present invention differs from Pfister by eliminating the slide plate and thereby economizing the design. The present invention also uses a different latch system, which eliminates guiding a latch member into slots as Pfister does, and is thus deemed easier to use.

The invention is a mounting bracket that includes a base plate fixed to an upright panel inside a combat vehicle. A carrier plate connects to the base plate so that it swings and vertically translates on the base plate. The carrier plate has a view screen mounted thereon, so that swinging the carrier plate away from the base plate will tilt the screen. A bridge plate is hinged to both the base plate and the carrier plate. A latch subassembly is disposed on the carrier plate. The subassembly has a finger that locks to either a tang on the bridge plate or a tab on the base plate. When the finger locks to the bridge plate's tang, the mounting bracket is in a deployed position and tilts the screen. When the finger locks to the base plate's tab, the mounting bracket is retracted and the screen lies flat against the upright panel in the vehicle. The latch subassembly includes a grip-squeeze actuator. Squeezing the actuator releases the carrier plate, which is then swung to or from the base plate. Thereupon the latch subassembly's finger locks respectively with the base plate or the bridge plate.

DETAILED DESCRIPTION

Figure 1:
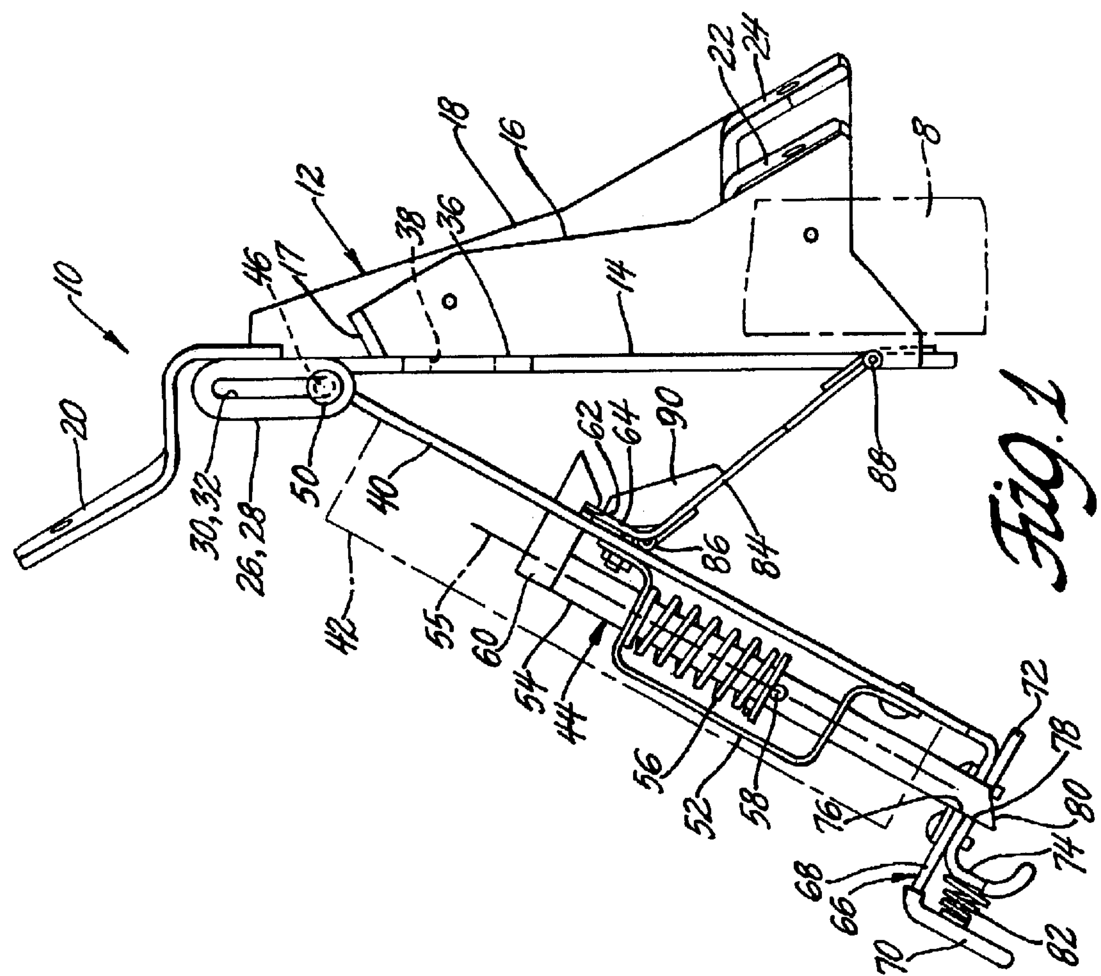
FIG. 1 is a side elevational view of the mounting bracket in a deployed configuration.
Figure 3:
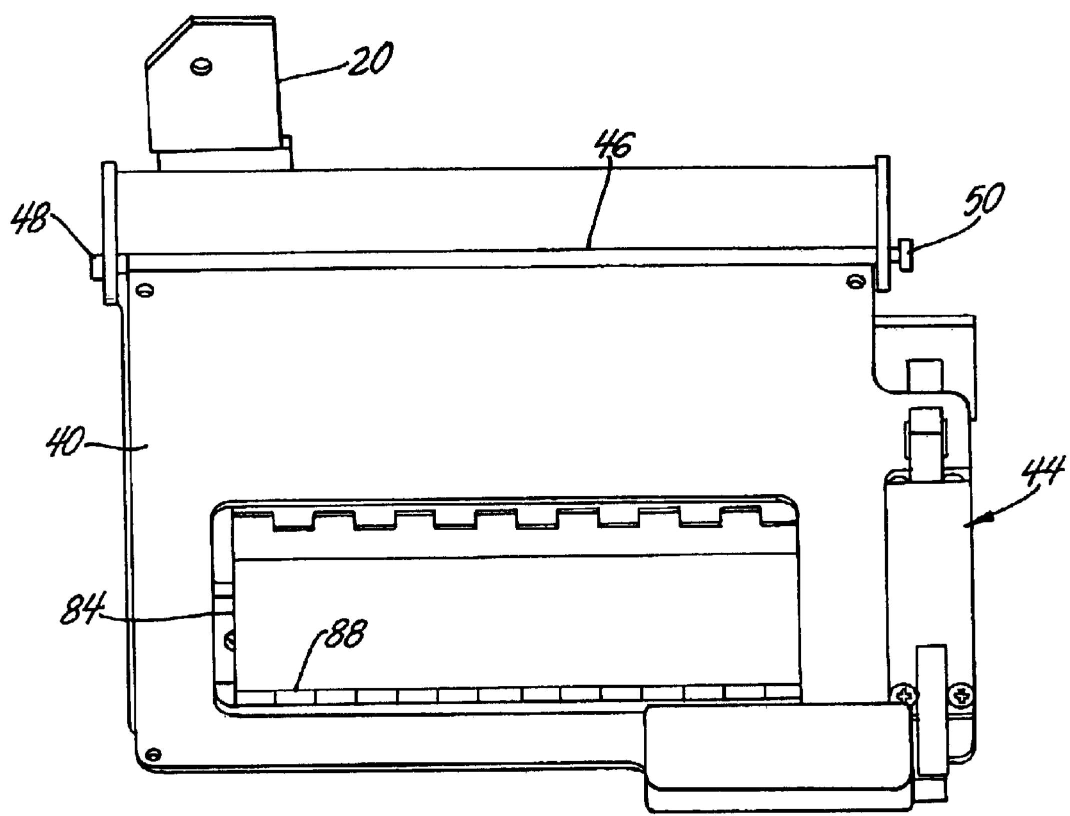
FIG. 3 is a front elevational view of the mounting bracket.
Figure 4:
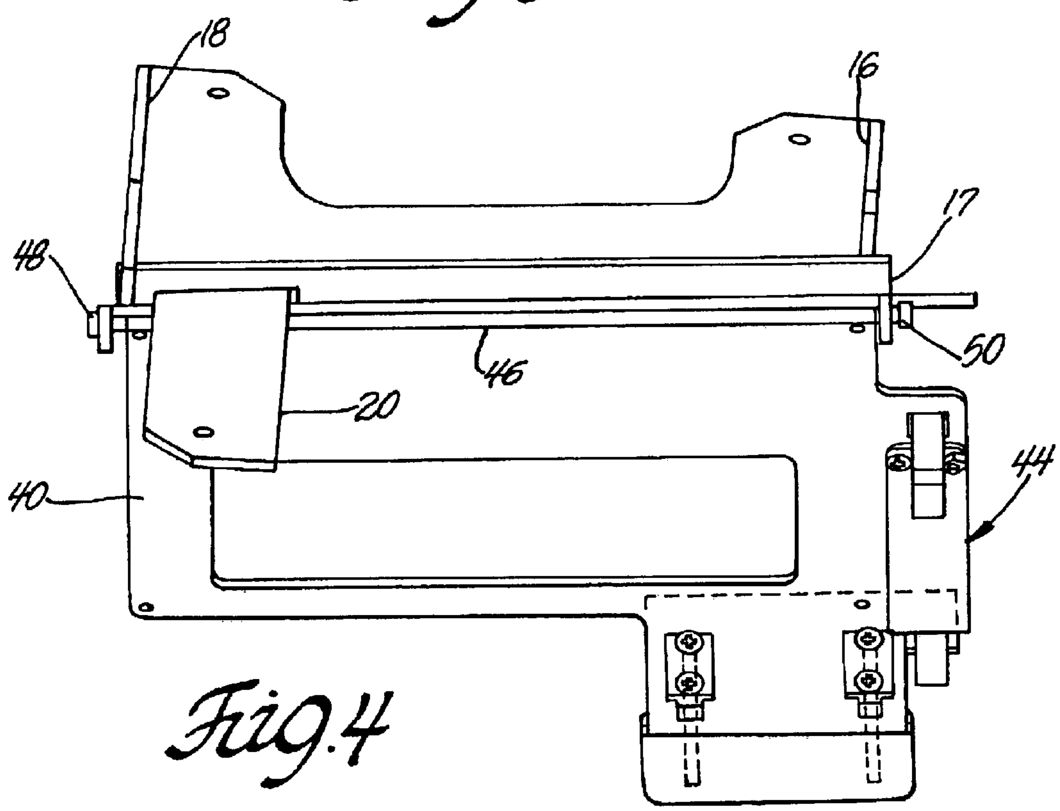
FIG. 4 is a top elevational view of the mounting bracket.
Figure 5:
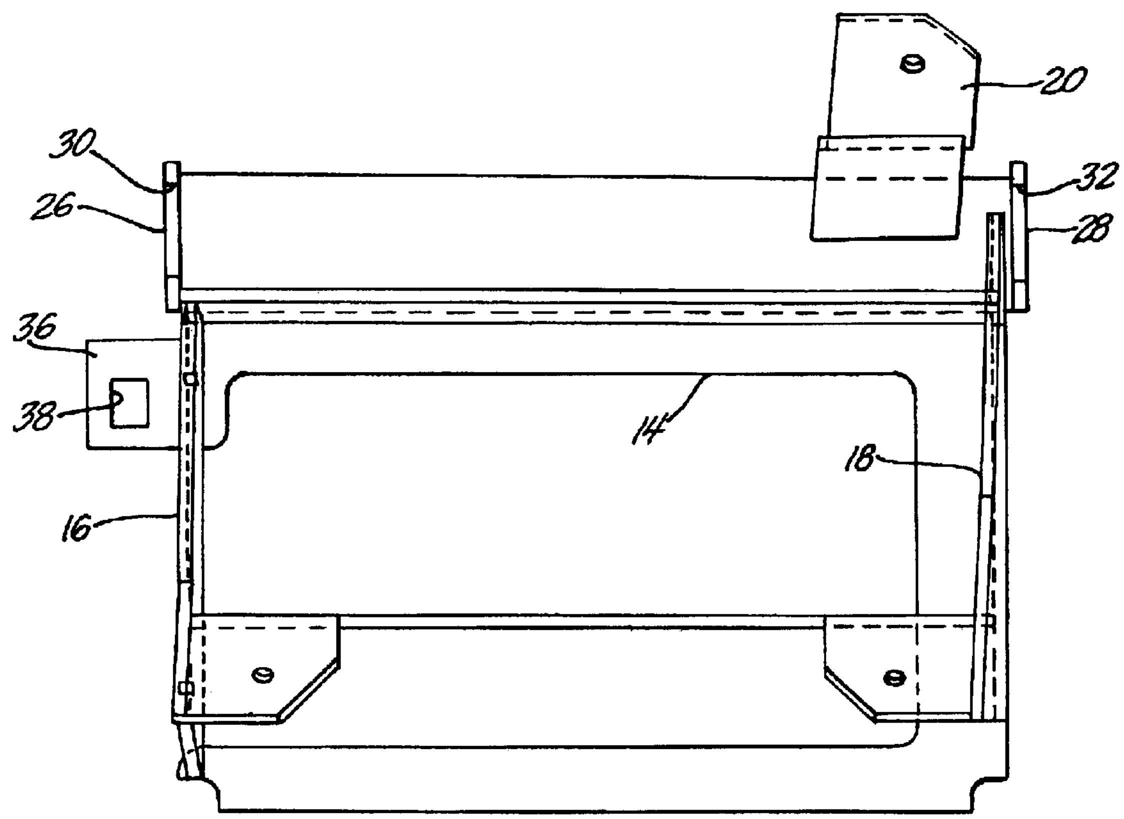
FIG. 5 is a rear elevational view of the base plate and neighboring structure.

FIG. 1 shows mounting bracket 10 whose bracket subassembly member 12 is affixed to an inner wall, post or other structural component 8 inside a combat vehicle, such as a tank or armored personnel carrier. Subassembly 12 has a generally U-shaped base or base plate 14, whose overall configuration is perhaps better shown in FIG. 5. Base plate 14 defines at its upper edge a pair of elongate ears 26 and 28 in registry with each other, the ears defining respective slots 30 and 32. Plate 14 also has a planar projection or tab 36 defining a rectangular hole 38.

Subassembly 12 has two elongate upright gussets 16 and 18 welded to the back of plate 14, one gusset being along each lateral edge of the base plate. A lateral flange 17 is welded to the gussets and to the back of plate 14. Subassembly 12 has apertured tabs that facilitate mounting bracket 10 being fastened to surrounding structure, this structure typically being a panel or post 8 the commander's station of the combat vehicle. In the particular embodiment shown, subassembly 12 has apertured tab 20 affixed at the top of plate 14, and has apertured tabs 22 and 24 affixed to gussets 16 and 18.

Figure 2:
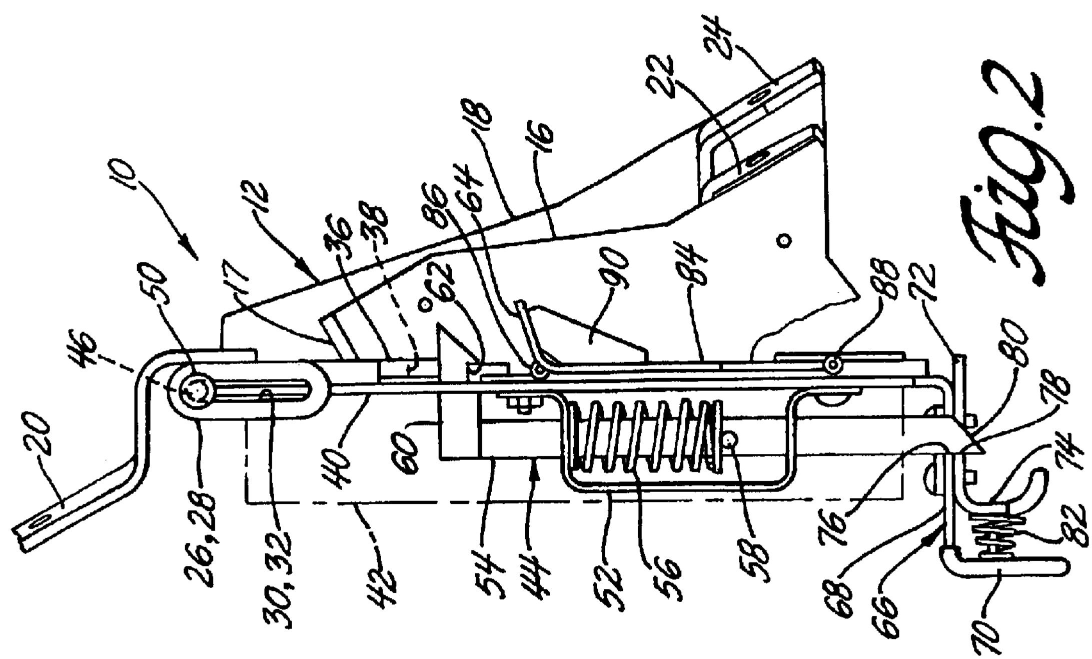
FIG. 2 is a side elevational view of the mounting bracket in a retracted configuration.

Swingably connected to ears 26 and 28 is a carrier or carrier plate 40, this plate having a deployed position shown in FIG. 1 in which it forms about a 30° angle with base plate 14. Carrier plate 40 has a retracted position in which it faces against the base plate, as seen in FIG. 2. The swinging connection between plate 40 and the ears is accomplished by a rod 46 at the top of plate 40, the rod's ends extending through the ears' slots 30 and 32. This connection allows the top of plate 40 to translate along the slots as the plate swings. Caps 48 and 50 on the ends of the rod prevent plate 40 from escaping its connection to the ears.

Plate 40 carries a computer monitor or other display screen 42, which faces somewhat upward during the deployed position of mounting bracket 10. Plate 40 additionally carries a latch subassembly 44 disposed alongside the screen. Preferably, the main body of the latch assembly extends no further from plate 40 than does screen 42, so that the latch subassembly's space claim in the combat vehicle is minimized. The latch subassembly includes a retainer 52 bolted to plate 40 and a latch bar 54 passing through the end walls of the retainer. The bar preferably has a rectangular cross section that fits with complimentary orifices in the end walls, so that the bar can not rotate about its longitudinal axis 55. Biasing spring 56 encircles the bar inside the retainer and is disposed between pin 58 protruding from the bar and one of the retainer's end walls. At one end of bar 54 is a catch mechanism such as finger 60 that extends through plate 40. Finger 60 defines detent 62, which catches tang 64 or tab 36, as explained later in further detail. Other catch mechanisms such as hooks or clips can be used.

Latch subassembly 44 is operated by manual grip-squeeze actuator 66, which is attached to the bottom of plate 40. The actuator includes a cross-sectionally L-shaped stationary member 68 fixed to plate 40, the stationary member having flange 70 extending down therefrom. Slidably connected to stationary member 68 is mobile member 72 having flange 74 integral therewith. These members define respective apertures 76 and 78 through which closely fits the tapered end 80 of latch bar 54. Between flanges 70 and 74 is a spring 82 that biases member 72 towards its FIG. 1 position, where apertures 76 and 78 are in registry. Squeezing mobile member 72 toward flange 70 drives an edge of aperture 78 against tapered end 80, thereby translating latch bar 54 upward along axis 55.

Figure 6:
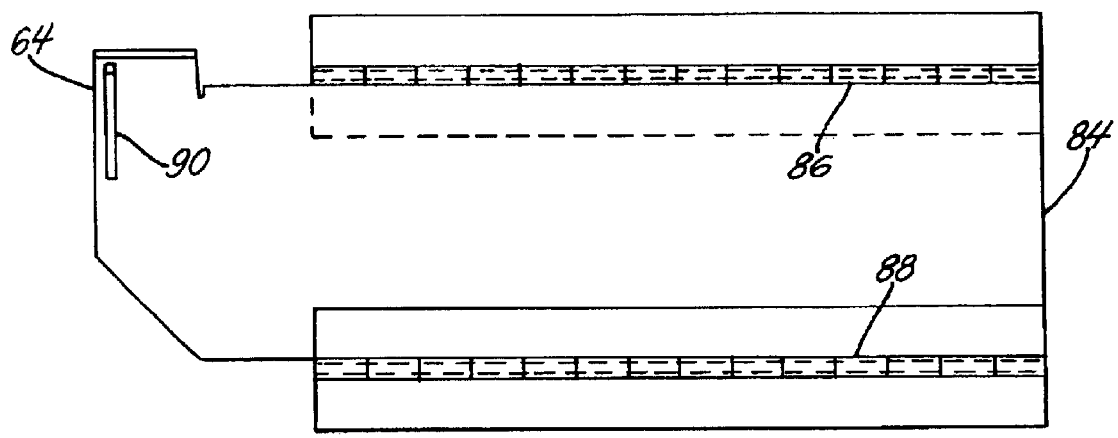
FIG. 6 is a rear elevational view of the bridge plate of the mounting assembly.

Hinged to both base plate 14 and carrier plate 40 is a bridge or bridge plate 84, a rear elevational view of which is shown in FIG. 6. Hinge 86 connects plate 84 to plate 40 and hinge 88 connects plate 84 to plate 14. Along one edge of bridge plate 84 is tang 64, which is stiffened by gusset 90. The edge of tang 64 is held by detent 62 of latch subassembly 44 so that plates 14, 40 and 84 are locked in their FIG. 1, deployed position. The bias of spring 56 maintains the engagement between tang 64 and detent 62.

In operation of bracket 10, tang 64 is released when bar 54 translates upward along axis 55. Thereupon plate 84 can swing and rise as rod 46 pivots and translates in slots 30 and 32. Plate 84 arrives at a position adjacently parallel to plate 14, as shown in FIG. 2. Here plate 14, plate 40 and plate 84 form a relatively flatter structure than in the FIG. 1, deployed position. It is contemplated that screen 42 will now be facing horizontally. As plate 84 swings and rises from its deployed position, tang 64 swings past tab 36 while finger 60 enters hole 38. Detent 62 catches the edge of hole 38 and maintains locking engagement therewith because of the bias of spring 56. Squeezing actuator 66 releases this locking engagement, so carrier plate 40 can move from its retracted position in FIG. 2 to its deployed position in FIG. 1.

Moving the mounting bracket between its retracted and deployed positions is a relatively simple action for a soldier. He squeezes actuator 66 while pushing or pulling carrier plate 40, the actuator serving as a handle by which the soldier holds the carrier plate. The soldier's motion is much quicker and easier motion than that used in known mounting brackets for screens at a commander's station. Since seconds or fractions thereof are critical in combat, the quicker motion for using mounting bracket 10 is significant.

Mobile member 72 is disposed generally between stationary member 68 and structural component 8. It is thus less likely that the mobile member will be struck so that it moves against tapered end 80. Should the mobile member be struck accidentally from below, it will be forced against stationary member 68, whereby contact friction between the two members increases. This in turn inhibits sliding of the mobile member against tapered end 80. By the foregoing design aspects, actuator 66 incorporates means to inhibit its accidental operation.

I do not desire to be limited to the exact details of construction or method shown herein since obvious modifications will occur to those skilled in the relevant arts without departing from the spirit and scope of the following claims.

What is claimed is:

1. A bracket for a display device which can be fixed in either of two orientations and moved quickly between the orientations, the bracket comprising:

a first plate;

second plate;

a sliding hinge connection between the first plate and the second plate, whereby the second plate can both slide and pivot relative to the first plate;

a bridge hinged to both the first plate and the second plate;

the bracket having a deployed configuration in which the second plate and the bridge form angles with the first plate;

the bracket having a retracted configuration in which the first plate, the second plate and the bridge form a flatter profile than in the deployed configuration a catch mechanism translatably connected to the second plate, the catch mechanism piercing a general plane occupied by the second plate;

means for translating the catch mechanism;

a first catch engagement region on the first plate;

a second catch engagement region on the bridge;

wherein the catch mechanism engages the first region during the retracted configuration and engages the second region during the deployed configuration.

2. The bracket of claim 1 wherein the translating means comprises:

a first member fixed to the second plate;

a second member slidable on the first member;

a drive edge defined by the second member;

a bar to which the catch mechanism is fixed, the bar translatably connected to the second plate; and a tapered end of the bar;

wherein sliding the second member engages the drive edge with the tapered end.

3. A bracket for mounting a display screen to a structure, wherein the screen can be quickly reoriented from one securely fixed position to another securely fixed position, the bracket comprising:

a base fixed to the structure;

a carrier capable of carrying the screen;

a sliding hinge connection between the base and the carrier, whereby the carrier can both pivot and slide relative to the base;

a bridle hinged both to the base and to the carrier;

the bracket having a deployed configuration in which the carrier and the bridge form angles with the base;

the bracket having a retracted position in which the base, the carrier and the bridge form a flatter profile than in the deployed configuration;

a finger translatably connected to the carrier, the finger piercing a general plane occupied by the carrier;

means for translating the finger;

a first finger engagement region on the base;

a second finger engagement region on the bridge;

wherein the finger engages the first region during the retracted configuration and engages the second region during the deployed configuration.

4. The bracket of claim 3 wherein the translating means comprises means for inhibiting accidental operation thereof.

5. The bracket of claim 3 wherein the translating means comprises a grip-squeeze actuator on a lower portion of the carrier wherein the actuator is also a handle for holding the carrier.

6. The bracket of claim 3 wherein the translating means comprises:

a first member fixed to the carrier;

a second member slidable on the first member;

a drive edge defined by the second member;

a translatable bar connected to the carrier, the finger fixed to the bar;

a tapered end of the bar; and means to bias the bar such that the tapered end is biased toward a location adjacent the drive edge;

wherein sliding the second member engages the drive edge with the tapered end.

* * * * *